United States Patent
Mäckel et al.

(10) Patent No.: US 7,095,137 B2
(45) Date of Patent: Aug. 22, 2006

(54) METHOD AND ARRANGEMENT FOR SUPPLYING QUIESCENT CURRENT TO A VEHICLE HAVING A MULTI-VOLTAGE ON-BOARD ELECTRICAL SYSTEM

(75) Inventors: Rainer Mäckel, Königswinter (DE); Thomas Schulz, Unterensingen (DE)

(73) Assignee: DaimlerChrysler AG, Stuttgart (DE)

( * ) Notice: Subject to any disclaimer, the term of this patent is extended or adjusted under 35 U.S.C. 154(b) by 535 days.

(21) Appl. No.: 10/314,443

(22) Filed: Dec. 9, 2002

(65) Prior Publication Data
US 2003/0127912 A1     Jul. 10, 2003

(30) Foreign Application Priority Data
Dec. 7, 2001    (DE) .................. 101 60 266

(51) Int. Cl.
*H02J 1/10*     (2006.01)
*H02M 1/10*     (2006.01)

(52) U.S. Cl. .................. 307/28; 307/29; 307/10.1
(58) Field of Classification Search .............. 307/75, 307/28, 29, 10.6, 9.1, 10.1; 327/415, 416, 327/417, 37, 71
See application file for complete search history.

(56) References Cited
U.S. PATENT DOCUMENTS

| | | | |
|---|---|---|---|
| 3,029,301 A * | 4/1962 | Strider ...................... 307/37 |
| 4,604,528 A * | 8/1986 | Norton ...................... 307/9.1 |
| 4,897,554 A * | 1/1990 | Uehara et al. ................ 307/29 |
| 5,166,538 A * | 11/1992 | Norton ...................... 307/10.1 |
| 5,418,402 A * | 5/1995 | Fujiwara ..................... 307/701 |
| 5,455,463 A * | 10/1995 | Langnickel et al. ....... 307/10.1 |
| 5,581,507 A * | 12/1996 | Scherpenberg et al. 365/189.09 |
| 6,313,546 B1* | 11/2001 | Nishimura et al. .......... 307/9.1 |
| 6,323,608 B1* | 11/2001 | Ozawa ....................... 318/139 |
| 6,396,336 B1* | 5/2002 | Roberts et al. ............. 327/544 |
| 6,718,927 B1* | 4/2004 | Goetze et al. ............. 307/10.6 |
| 7,042,115 B1* | 5/2006 | Mizutani et al. ........... 307/10.1 |
| 2006/0110655 A1* | 5/2006 | Wirdel ....................... 429/61 |

FOREIGN PATENT DOCUMENTS

DE     199 21 451 C1    11/2000

* cited by examiner

*Primary Examiner*—Brian Sircus
*Assistant Examiner*—Andrew M. Deschere
(74) *Attorney, Agent, or Firm*—Crowell & Moring LLP

(57) ABSTRACT

A method and arrangement for supplying quiescent current to a vehicle having a multi-voltage on-board electrical system with at least two on-board electrical subsystems having different voltage levels during normal operation. The voltage levels of the on-board electrical subsystems are reduced to a uniform value when the engine is stationary.

12 Claims, 2 Drawing Sheets

METHOD AND ARRANGEMENT FOR SUPPLYING QUIESCENT CURRENT TO A VEHICLE HAVING A MULTI-VOLTAGE ON-BOARD ELECTRICAL SYSTEM

BACKGROUND AND SUMMARY OF THE INVENTION

This application claims the priority of German Application No. 101 60 266.9, filed Dec. 7, 2001, the disclosure of which is expressly incorporated by reference herein.

The invention relates to a method and an arrangement for supplying quiescent current to a vehicle having a multi-voltage on-board electrical system with at least two on-board electrical subsystems.

A conventional multi-voltage on-board electrical system is known, for example, from German Patent DE 199 21 451 A1. The multi-voltage on-board electrical system of this reference includes a plurality of on-board electrical system circuits or on-board electrical subsystems having power supply sources which have different voltages intended for respective different loads. Decentralized electronic controllers for controlling and regulating associated loads are supplied with power by means of the on-board electrical subsystems. Depending on the type and design of the multi-voltage on-board electrical system, the on-board electrical subsystems are supplied with power by a common generator which supplies power directly to one of the on-board electrical subsystems, in particular the on-board electrical subsystem for high-consumption loads and for the starter region. This on-board electrical subsystem is assigned its own battery, for example, a 36 V battery in the case of a 42 V on-board electrical subsystem. The 14 V loads which are associated with a further on-board electrical subsystem are connected to the generator via a DC voltage transformer, referred to as a DC/DC transformer. This on-board electrical subsystem has its own associated battery, in particular a 12 V battery. In vehicles with a high level of equipment, such interconnection and decentralization of electronic controllers leads to problems with a long-term energy supply from the battery, in particular to problems with what is referred to as the wake-up capability of the controllers when the vehicle is inactive for a relatively long time, for example at airports.

In order to maintain the wake-up capability of the controllers, they are usually supplied with a low current when the vehicle is stationary. If a controller is then woken up, whether as a result of an external process, for example, a closing process, or as a result of an internal fault, the controllers are automatically woken up and activated by means of a bus system, for example, a CAN bus. This leads to increased power drain and to a significant reduction of the energy reserves. In order to stabilize the on-board electrical system voltage during peak current demand, in a two-voltage on-board electrical system, a battery, which has a high voltage level and is not used for supplying quiescent current, is generally employed. In order to supply quiescent current, in particular a further battery with a lower voltage is used. In order to supply quiescent current in such a way, the controllers with the relatively high voltage are additionally connected by cables to the energy storage means of the on-board electrical subsystem with the low voltage. This leads to a particularly complicated cabling arrangement. Furthermore, this does not eliminate the problem of faulty controllers leading to the waking-up of the bus system and thus to the activation of all the controllers.

It is therefore an object of the present invention to specify a method for supplying quiescent current to a vehicle having a multi-voltage on-board electrical system having at least two on-board electrical subsystems which have different voltage levels during normal operation, and which permits the entire multi-voltage on-board electrical system to be provided with the lowest possible quiescent current in the simplest possible way and with the smallest possible degree of expenditure on cables. Furthermore, it is an object to provide an arrangement for supplying quiescent current which is particularly simple in design.

According to the invention the quiescent current is supplied in such a way that, when the engine is stationary, the voltage levels of the on-board electrical subsystems are reduced to a uniform value. By uniformly reducing the voltage level in such a way in all the on-board electrical subsystems, there is no requirement for separate cabling of loads with a battery to ensure the supply of quiescent current. Furthermore, the direct connection of one of the on-board electrical subsystems to the other on-board electrical subsystem or subsystems permits all the loads, and thus also their controllers, of all the on-board electrical subsystems to be supplied. The uniform value expediently corresponds approximately to the value of the lowest voltage level of all the on-board electrical subsystems. As a result, on the one hand, the lowest possible quiescent current drain is ensured and, on the other hand, it ensures that the battery which covers the peak current demand is not required for supplying quiescent current. The voltage levels are preferably reduced to a uniform value of approximately 6 V to 14 V. It is thus also possible to supply loads with a relatively high voltage. In the case of a quiescent current supply, a resultant relatively slow response, possibly also with reduced effect, is sufficient.

The on-board electrical subsystems are preferably isolated from the respectively associated energy storage device and are connected to one another by connection element in such a way that the charge is drawn from the energy storage device which ensures the quiescent-current operating mode. This is a particularly simple embodiment which avoids complex cabling.

Also provided according to the present invention is an arrangement for supplying quiescent current in a multi-voltage on-board electrical system having at least two on-board electrical subsystems which have different voltage levels during normal operation, in which case, when the engine is stationary, an isolator element isolates the on-board electrical subsystems from the respectively associated energy storage devices, and a connection element connects the on-board electrical subsystems to one of the energy storage devices. This ensures that only one of the energy storage devices is used to supply all the loads in the quiescent-current operating mode. Furthermore, the existing cabling can be used. Additional cabling connecting all the loads to the battery ensures that the quiescent-current operating mode is reliably avoided because the on-board electrical subsystems are connected to one another by a simple connection element in such a way that charge is drawn only from the battery which ensures the quiescent-current operating mode.

The connection element is expediently designed in such a way that the on-board electrical subsystems are disconnected during normal operation. The connection element is preferably designed as a semiconductor element having an optimum conductivity property in the quiescent-current operating mode and a very good blocking property during normal operation. The connection element expediently includes at least one diode or at least one transistor element. Depending on the type and design of the multi-voltage on-board electrical system, the on-board electrical subsystems are connected to one another by a diode or by a plurality of diodes connected in series.

During normal operation, the on-board electrical subsystems are preferably connected to one another by a DC/DC transformer. As a result, during normal operation on-board electrical subsystems having different voltage levels are reliably disconnected. In order to connect the on-board electrical subsystems in the quiescent-current operating mode, the connection element is preferably arranged in parallel with the DC/DC transformer.

Other objects, advantages and novel features of the present invention will become apparent from the following detailed description of the invention when considered in conjunction with the accompanying drawings.

BRIEF DESCRIPTION OF THE DRAWINGS

The exemplary embodiments of the invention are explained in more detail with reference to a drawing, in which.

DETAILED DESCRIPTION OF THE DRAWING

Parts which correspond to one another are provided with identical references in each of the figures.

Figure 1:
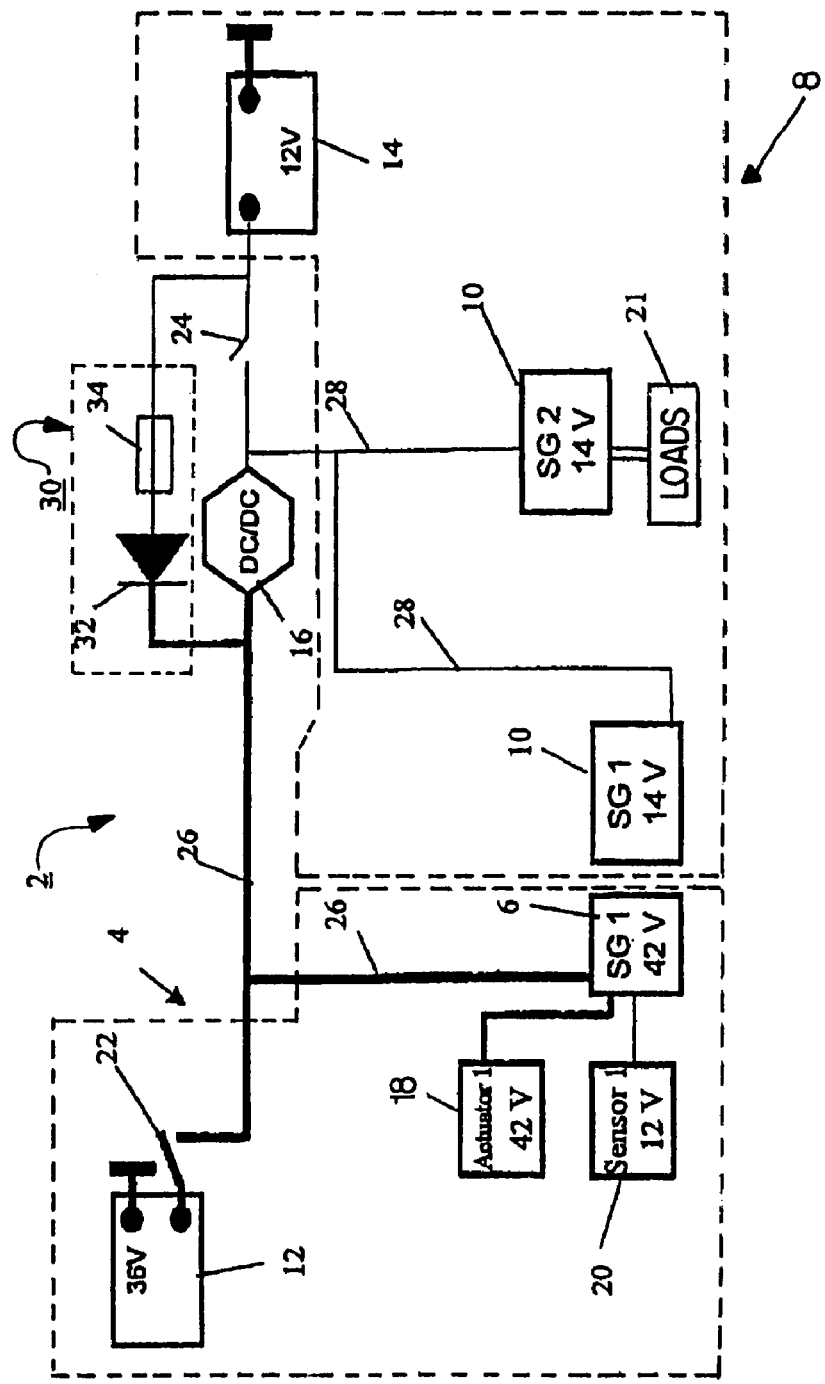
FIG. 1 is a schematic view of an arrangement for supplying quiescent current to a multi-voltage on-board electrical system of a vehicle having a connection element for connecting two on-board electrical subsystems.

FIG. 1 shows an arrangement for supplying quiescent current in a multi-voltage on-board electrical system 2. The multi-voltage on-board electrical system 2 includes a first on-board electrical subsystem 4 having a first voltage supply of 42 V for associated loads and a second on-board electrical subsystem 8 with a second voltage supply of, for example, 12 V for associated loads 21. The respective on-board electrical subsystems 4 and 8 are assigned an energy storage means 12 or 14 respectively. The energy storage means 12 is, for example, a 36 V battery, and the energy storage means 14 is a 12 V battery or what are referred to as supercapacitors.

Depending on the type and design of the multi-voltage on-board electrical system 2, the on-board electrical subsystems 4, 8 and their energy storage means 12, 14 can have other voltage levels or more than two on-board electrical subsystems 4 and 8 can be provided with different voltage levels. During normal operation of the multi-voltage on-board electrical system 2, the two on-board electrical system circuits or on-board electrical subsystems 4 and 8 are connected to one another by means of a DC voltage transformer 16. By means of the DC voltage transformer 16, for example a DC/DC transformer, the two on-board electrical subsystems 4 and 8 are disconnected from one another, a rectified energy flow being carried out from the on-board electrical subsystem 4 with a high voltage level of 42 V to the on-board electrical subsystem 8 with a low voltage level of 12 V via the DC voltage transformer 16.

Controller 6 of safety-related systems, for example, electromechanical brakes, are preferably supplied by means of the on-board electrical subsystem 4. On the one hand, actuators 18 of the safety-related systems are supplied with the high voltage of 42 V by means of the controller 6. Furthermore, the controller 6 is also used to actuate sensors 20 with a relatively low voltage of 12 V. The on-board electrical subsystem 8 with the low voltage level of 12 V supplies the controller 10, and these in turn control associated loads 21.

During normal operation of the vehicle, all the controllers 6 and 10 are activated and are supplied by means of the respective on-board electrical subsystem 4 or 8. For this purpose, an isolator element 22 or 24 which is assigned to the respective on-board electrical subsystem 4 or 8 is closed. That is to say the controller 6 with a high voltage level is connected via a line connection path 26 to the associated energy storage means 12 for the on-board electrical subsystem 4. The controllers 10 with a low voltage level are connected via a line connection path 28 to the associated energy storage means 14 for the on-board electrical subsystem 8.

When the vehicle is stationary, usually only a few controllers 6 or 10 are operating. In order to limit such a quiescent-current drain and to ensure the ability of the vehicle to start even when it has been stationary for a relatively long time, the voltage levels of the on-board electrical subsystems 4 and 8 are reduced to a uniform value, preferably to the value of the lowest voltage level of all the on-board electrical subsystems 4 and 8. For this purpose, the on-board electrical subsystems 4 and 8 are disconnected from the respectively associated energy storage means 12 or 14 by means of the respective isolator element 22 or 24, and connected to the energy storage means 14 by means of a connection element 30. The connection element 30 is arranged parallel to the DC voltage transformer 16.

Depending on the type and design, the on-board electrical subsystems 4 and 8 can also be connected to the other energy storage means 12. However, energy storage means 14 with a low voltage level is preferably used. This makes it possible for controller 6 with a high voltage level, for example for an anti-theft warning system, which must not be switched off, to be supplied by the energy storage means 14 of the other on-board electrical subsystem 8 via the connection element 30. There is thus no need for additional cabling connecting the controllers 6 to the respective energy storage means 14.

The connection element 30 is preferably formed from at least one semiconductor element 32 or, if appropriate, a fuse element 34. The 42 V on-board electrical subsystem 4 is connected to the 12 V energy storage means 14 by means of the semiconductor element 32. At least one diode or one transistor is preferably used as the semiconductor element 32.

During normal operation, i.e. the voltage of 42 V in the on-board electrical subsystem 4 is higher than the voltage of 12 V in the on-board electrical subsystem 8, the semiconductor element 32 blocks the energy flow from the on-board electrical subsystem 4 to the on-board electrical subsystem 8. The two on-board electrical subsystems 4 and 8 are thus disconnected from one another by means of the connection of the semiconductor element 32. If the vehicle is then deactivated, the isolator elements 22 and 24 are opened. The voltage level in the on-board electrical subsystems 4 and 8 drops. If the voltage in the on-board electrical subsystem 4 drops below the voltage of the 12 V energy storage means 14, the semiconductor element 32 opens and the controllers 6 of the on-board electrical subsystem 4 and the controllers 10 of the on-board electrical subsystem 8 are supplied by the 12 V energy storage means 14. Thus, in the quiescent-current operating mode, the voltage level in the on-board electrical subsystems 4 and 8 is reduced to the uniform value of 12 V. This makes it possible for sensors 20 which are necessary in the quiescent operating mode to remain active, because these sensors 20 are usually operated with a voltage of 12 V. If these sensors 20 sense, for example, events which make it necessary for the energy storage means 12 to be connected to a high voltage level of 42 V or for other controllers 6 or 10 to be activated, the respective isolator elements 22 and 24 are closed again.

In order to ensure the highest possible degree of reliability, the semiconductor element 32 may be composed of a plurality of diodes connected in series. If there is a breakdown at the diode, the fuse 34 is expediently connected in series with the diode. This reliably avoids short-circuiting of different voltage levels. As an alternative to the diode, a transistor can be used as the semiconductor element 32.

Figure 2:
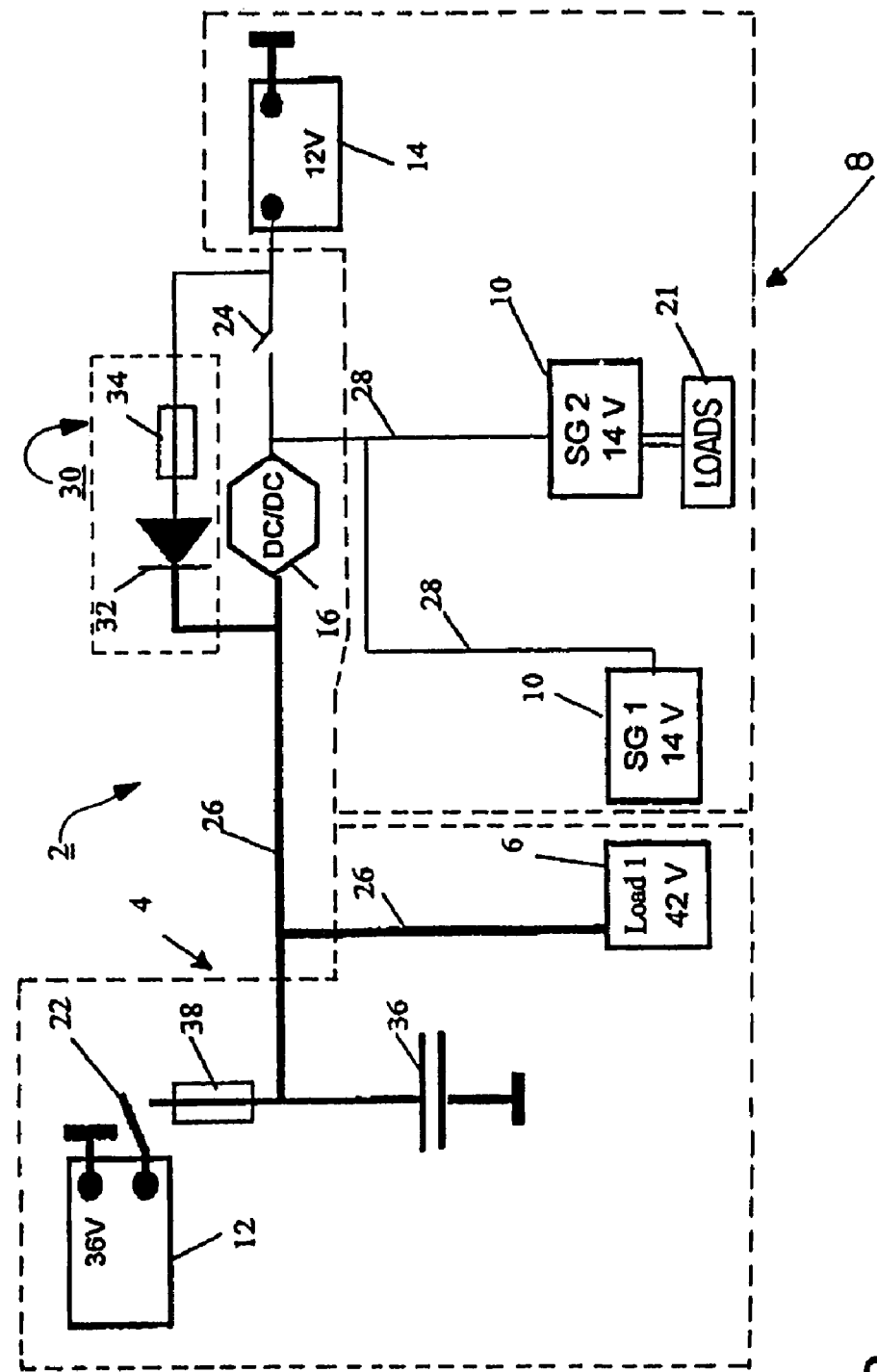
FIG. 2 is a schematic view of an alternative embodiment of the arrangement 1 according to FIG. 1.

FIG. 2 illustrates a further embodiment of the arrangement 1. Due to large electrical loads 6 in the on-board electrical subsystem 4 with the high voltage level of 42 V, capacitors 36 with high capacitances are assigned to the on-board electrical subsystem 4. If the capacitors 36 are discharged and if the isolator element 22 of the respective on-board electrical subsystem 4 is closed again after the quiescent-current operating mode, the capacitor 36 virtually constitutes a short-circuit. In order to avoid this, a fuse element 38 is provided which is triggered, when the voltage is connected, by a resulting large flow of current. The connection element 30 according to the invention, which is arranged in parallel with the DC voltage transformer 16, precharges the capacitor 36 during the quiescent-current operating mode so that the current is limited. If the resulting charge current is not sufficient, it is possible, when switching over to the normal operation, to first close the isolator element 24, which causes the voltage at the capacitor 36 to be increased by means of the DC voltage transformer 16. In an analogous fashion, when the energy storage means 12 and 14 are disconnected, only the isolator element 22 is first opened in order to isolate the energy storage means 12. Here, on the one hand, the capacitor 36 can then be discharged via the quiescent-current drain of the loads 6 and 10. On the other hand, for safety reasons, the capacitor 36 could also be discharged via the DC voltage transformer 16 in order to charge the energy of the 12 V battery 14. Thus, when the engine is stationary, the arrangement 1 permits a saving in quiescent current to be achieved in a two-voltage or multi-voltage on-board electrical system in a particularly simple way. As a result, the drain on at least one of the energy storage means 12 or 14 is considerably reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for supplying quiescent current to a vehicle having a multi-voltage on-board electrical system with at least two on-board electrical subsystems, comprising the steps of:
   simultaneously providing different voltage levels to each of said at least two on-board electrical subsystems during normal operation of an engine of said vehicle; and
   when the engine is off, reducing voltage levels of each of said at least two on-board electrical subsystems to a uniform value which is substantially equal to a lowest one of said different voltage levels.

2. The method according to claim 1, wherein the voltage levels are reduced to a uniform value substantially between 6 V and 14 V.

3. The method according to claim 1, wherein the on-board electrical subsystems are isolated from respectively associated energy storage means and are connected to one another by means of a connection element in such a way that charge is drawn from one of said energy storage means in order to ensure a quiescent-current operating mode.

4. An arrangement for supplying quiescent current in a multi-voltage electrical system, said arrangement comprising:
   at least two electrical subsystems, having respective different voltage levels during a first time period of the multivoltage electrical system;
   a first and second isolator element for respectively isolating each of electrical subsystems from respectively associated energy storage means, during a second time period; and
   a connection element for connecting each electrical subsystems to one of the energy storage means when a voltage of one of said subsystems falls below a predetermined level during said second time period.

5. The arrangement according to claim 4, wherein said connection element connects each of said at least two electrical subsystems to each other during said second time period when said voltage of one of said subsystems falls below said predetermined level.

6. The arrangement according to claim 4, wherein the connection element is a semiconductor element.

7. The arrangement according to claim 4, wherein the connection element comprises at least one diode or at least one transistor element.

8. The arrangement according to claim 4, wherein during said first time period, the at least two electrical subsystems are connected to one another by means of a DC/DC transformer.

9. The arrangement according to claim 8, wherein the connection element is arranged in parallel with the DC/DC transformer.

10. The arrangement according to claim 5, wherein the connection element is designed so as to not provide a connection between the electrical subsystems during said first time period.

11. The arrangement according to claim 4, wherein said multi-voltage electrical system is on-board an engine of a vehicle.

12. The arrangement according to claim 11, wherein said first time period occurs during normal operation of said engine and wherein said quiescent current is supplied during said second time period.

* * * * *